(12) United States Patent
Norrman et al.

(10) Patent No.: US 9,503,890 B2
(45) Date of Patent: Nov. 22, 2016

(54) METHOD AND APPARATUS FOR DELIVERING KEYING INFORMATION

(75) Inventors: Karl Norrman, Stockholm (SE); Rolf Blom, Järfälla (SE); Fredrik Lindholm, Älvsjö (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 1780 days.

(21) Appl. No.: 12/095,813

(22) PCT Filed: Jul. 11, 2006

(86) PCT No.: PCT/EP2006/064107
§ 371 (c)(1),
(2), (4) Date: Jun. 2, 2008

(87) PCT Pub. No.: WO2007/062882
PCT Pub. Date: Jun. 7, 2007

(65) Prior Publication Data
US 2008/0273704 A1     Nov. 6, 2008

(30) Foreign Application Priority Data
Dec. 1, 2005   (EP) .................. PCT/EP2005/056387

(51) Int. Cl.
*H04L 9/32*        (2006.01)
*H04W 12/02*    (2009.01)
(Continued)

(52) U.S. Cl.
CPC ............ *H04W 12/02* (2013.01); *H04L 63/062* (2013.01); *H04L 63/08* (2013.01); *H04L 65/1016* (2013.01); *H04W 12/04* (2013.01)

(58) Field of Classification Search
CPC ............................. H04L 9/0811; H04L 9/0838
USPC .............................. 380/28; 713/171; 726/4–6
See application file for complete search history.

(56) References Cited

U.S. PATENT DOCUMENTS

2002/0167965 A1* 11/2002 Beasley et al. ............... 370/465
2004/0078571 A1*  4/2004 Haverinen .................... 713/168
2006/0171541 A1   8/2006 Horn et al.

OTHER PUBLICATIONS

Shin-Ming Cheng et al: "Key caching mechanism for AAA over mobile IP" Vehicular Technology Conference, 2005. VTC—2005—Fall. 2005 IEEE $62^{nd}$ Dallas, TX, USA Sep. 25-28, 2005, Piscataway, NJ, USA, IEEE, pp. 1222-1226, XP010878750 ISBN: 0-7803-9152-7 p. 1222-p. 1223.

(Continued)

*Primary Examiner* — Anthony Brown
(74) *Attorney, Agent, or Firm* — Patents on Demand, P.A.; Brian K. Buchheit; Scott M. Garrett

(57) ABSTRACT

A method of delivering an application key or keys to an application server for use in securing data exchanged between the application server and a user equipment, the user equipment accessing a communications network via an access domain. The method comprises running an Authentication and Key Agreement procedure between the user equipment and a home domain in order to make keying material available to the user equipment and to an access enforcement point. At least a part of said keying material is used to secure a communication tunnel between the user equipment and the access enforcement point, and one or more application keys are derived within the home domain using at least part of said keying material. Said application key(s) is(are) provided to said application server, and the same application key(s) derived at the user equipment, wherein said access enforcement point is unable to derive or have access to said application key(s).

33 Claims, 11 Drawing Sheets

(51) Int. Cl.
*H04L 29/06* (2006.01)
*H04W 12/04* (2009.01)

(56) References Cited

OTHER PUBLICATIONS

Menezes, et al. Handbook of Applied Cryptography. Handbook of Applied Cryptography, CRC Press Series on Discrete Mathematics and ITS Applications, 1997. pp. 568, 570-571.

3rd Generation Partnership Project; Technical Specification Group Services and System Aspects; Generic Authentication Architecture (GAA); Generic bootstrapping architecture (Release 6). 3GPP TS 33.220 v6.6.0 (Sep. 2005).

3rd Generation Partnership Project; Technical Specification Group Services and System Aspects; Generic Authentication Architecture (GAA); Generic Bootstrapping architecture (Release 7). 3GPP TS 33.220 v7.1.1 (Oct. 2005).

* cited by examiner

METHOD AND APPARATUS FOR DELIVERING KEYING INFORMATION

CLAIM OF PRIORITY

This application is a 371 of International Application No. PCT/EP2006/064107, filed Jul. 11, 2006, which claims the benefit of a foreign priority to European Patent Office (EPO) Application No. PCT/EP2005/056387, filed Dec. 1, 2005. The content of these documents are hereby incorporated herein by reference for all purposes.

FIELD OF THE INVENTION

The present invention relates to a method and apparatus for delivering keying information and in particular, though not necessarily, to a method and apparatus for delivering service related keying information. The invention is applicable in particular, though not necessarily, to the distribution of keying information in a communications system comprising a Universal Mobile Telecommunications System network facilitating wireless access for user equipment.

BACKGROUND TO THE INVENTION

The Third Generation Partnership Project (3GPP) was formed as a collaboration agreement bringing together a number of standards bodies with the aim of standardising globally applicable technical specifications for third generation mobile systems based on evolved GSM core networks and the radio access technology Universal Terrestrial Radio Access (UTRA).

3GPP has specified a protocol known as Authentication and Key Agreement (AKA) for performing authentication and session key distribution in Universal Mobile Telecommunications System (UMTS) networks. UMTS AKA is specified in 3GPP TS.33.102 and is a challenge-response based mechanism that uses symmetric cryptography. AKA is typically run in a UMTS Services Identity Module (USIM), which resides on a smart card like device (referred to as a Universal Integrated Circuit Card or UICC) that also provides tamper resistant storage of shared secrets. AKA is run at registration and re-registration of a User Equipment (UE—where a UE is defined as the combination of a Mobile Station (MS) and a USIM) with its home network. AKA may be employed in 2G networks (i.e. GSM), in which case the UICC will be provisioned with both the USIM and Subscriber Identity Module (SIM) applications. In addition, it is likely that next generation architectures (including the Long Term Evolution architecture currently being standardised) will use AKA or an AKA based security protocol.

One of the key objectives of UMTS AKA is to provide for the securing of data on the link between the User Equipment (UE) and an Enforcement Point (EP) where access policy is enforced within the UMTS access network. In the case of a circuit switched connection, e.g. a voice call, this EP will be within the Radio Network Controller (RNC), and in the case of a packet switched connection it will be within the Serving Gateway Support Node (SGSN). In the case of a GSM network the EP will be within the Base Transceiver Station (BTS). In a LTE network, an EP may for example be within a User Plane Entity (UPE), with possibly multiple EPs present for a single connection. AKA achieves appropriate security levels by delivering to the access network keying material generated using a secret shared K between the USIM on the UE and the Home Location Register (HLR)/Authentication Centre (AuC). N.B. The HLR/AUC enhanced with IP Multimedia Subsystem functionality is referred to as the Home Subscriber Server (HSS).

Considering a packet switched access network, signalling associated with AKA is shown in FIG. 1, where the process is initiated by the UE (a combination of the USIM and the ME) sending an attach request to the SGSN in the access network. The SGSN then requests an Authentication Vector (AV) from the HSS in the UE's home network which in turn requests the AV from an Authentication Centre (AuC). Whilst FIG. 1 shows only the packet switched domain, it will be appreciated that the Visited Location Register (VLR) will perform functions corresponding of the SGSN functions in the circuit switched domain. Where reference is made to "SGSN" in the following discussion, it will be appreciated that the VLR will provide equivalent functionality in the circuit switched domain.

Two keys result from the UMTS AKA run, namely a cipher key (CK) and an integrity key (IK). CK and IK are generated at the HSS on the basis of a secret shared between the HSS and the USIM of the UE, and a random value RAND. The HSS also generates an expected result XRES by applying a suitable function to the shared secret and the random value. The keys, together with the RAND value, XRES and an authentication token (AUTN), are sent by the HSS to the SGSN. The SGSN forwards the RAND and AUTN values to the UE where they are delivered to the USIM. The SGSN also passes the keys CK and IK to the enforcement function in the SGSN. The USIM authenticates the HSS, and hence verifies the trust relationship between the home network and the EP, using the AUTN value. The USIM also generates the keys CK and IK using the RAND value and the shared secret. On the basis of the keys CK and IK, a secure tunnel can be established between the EP within the SGSN and the UE. This secures communication over the access network, and in particular the air interface. The USIM also generates a result RES using the shared secret and the RAND value, and returns this to the SGSN. The SGSN compares RES with XRES, and if the two agree traffic is allowed to flow through the secure tunnel.

The provision of specific applications (i.e. services) to a UE will often require that the UE be authenticated to the application server and that a secure channel be established between the UE and the application server via which delivery of a service or application can take place. One might think, for example, of the delivery of a mobile TV service, where media should only be delivered to users that have subscribed to (and paid for) the service.

3GPP Technical Specification TS 33.220 specifies the so-called Generic Bootstrapping Architecture (GBA). GBA provides a mechanism whereby a client terminal (UE) can be authenticated to a Network Authentication Function (NAF)—i.e. the service node or service provider—and secure session keys (Ks_NAF) obtained for use between the UE and the NAF, based upon keys CK and IK obtained during a re-run of the AKA procedure (this procedure should be distinguished from the initial AKA process run at registration or re-registration of the UE). A Bootstrapping Server Function (BSF) is introduced into the UE's home network, and the AKA re-run is between the UE and the BSF.

The simple network model for the GBA architecture is illustrated in the schematic diagram of FIG. 2. When a UE knows that a bootstrapping procedure is required, it will first perform a bootstrapping authentication with the BSF using the http digest AKA procedure (RFC 3310). Keys CK and IK will be agreed upon between the UE and the BSF (again, these keys must be distinguished from the keys agreed at registration or re-registration and which are used to secure the radio link). The BSF also provides to the UE a unique bootstrapping transaction identifier (B-TID). When a UE and a NAF wishes to obtain session keys from the BSF, the UE delivers the B-TID to the NAF, which the NAF then forwards to the BSF. The B-TID contains an index which the BSF uses to identify the UE and obtain appropriate NAF specific keys (Ks_NAF). The NAF specific keys are then forwarded to the NAF. The lifetime of the key material is set according to the local policy of the BSF.

AKA and GBA can both be employed to provide security to and within the so-called IP Multimedia Core Network Subsystem (IMS). IMS is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Release 5 and Release 6). IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 3 illustrates schematically how the IMS fits into the mobile network architecture in the case of a GPRS/PS access network. Call/Session Control Functions (CSCFs) operate as SIP proxies with the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers in the IMS using the specified SIP REGISTER method. This is a mechanism for attaching to the IMS and announcing to it the address at which a SIP user identity can be reached. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions, which sessions would otherwise bypass the S-CSCF.

During the registration process, it is the responsibility of the I-CSCF to select an S-CSCF if an S-CSCF is not already selected. The I-CSCF receives the required S-CSCF capabilities from the home network's Home Subscriber Server (HSS), and selects an appropriate S-CSCF based on the received capabilities. It is noted that S-CSCF allocation is also carried for a user by the I-CSCF in the case where the user is called by another party, and the user is not currently allocated an S-CSCF. When a registered user subsequently sends a session request to the IMS, the P-CSCF is able to forward the request to the selected S-CSCF based on information received from the S-CSCF during the registration process.

Every IMS user possesses one or more Private User Identities. A private identity is assigned by the home network operator and is used by the IMS, for example, for registration, authorisation, administration, and accounting purposes. This identity takes the form of a Network Access Identifier (NAI) as defined in RFC 2486[14]. It is possible for a representation of the International Mobile Subscriber Identity (IMSI) to be contained within the NAI for the private identity. In addition to a Private User Identity, every IMS user shall have one or more Public User Identities. The Public User Identity/identities are used by any user to request communications to other users. A user might for example include a Public User Identity (but not a Private User Identity) on a business card.

The IMS authentication procedure is described on a very high level in FIG. 4. Within the UE, AKA is handled by an IP Multimedia Services Identity Module (ISIM). The AKA protocol performs authentication of the User Equipment (UE) to the S-CSCF and vice versa, and is analogous to the AKA process described above. The Authentication Vector (AV) is obtained by the S-CSCF and is delivered to the P-CSCF via the I-CSCF. FIG. 5 illustrates how GBA may be mapped to the IMS architecture, with the BSF functionality being implemented at the S-CSCF and the P-CSCF sitting between the S-CSCF and the UE. The EP exists within the P-CSCF. This is considered in the ETSI TISPAN working group proposal 07-TD-17.

SUMMARY OF THE INVENTION

As has been explained above, GBA performs a re-run of the AKA procedure in order to establish fresh keying material (CK, IK) which can in turn be used to generate application/service specific (NAF) keys. This adds to session setup times, wastes bandwidth, and requires the specification and implementation of two different procedures at the UE and within the network. It would be efficient to implement a mechanism whereby the keying material generated in the initial AKA procedure can be reused by the GBA procedure, thus avoiding the need for a re-run of AKA.

It is of course possible to generate the application/service specific (NAF) keys using the initial keying material. However, as will be apparent from FIG. 1, the initial keying material is made available to the EP. The EP would therefore be able to decrypt traffic exchanged between the UE and the application/service provider using the derived keying material, as well as to impersonate the UE to an application/service provider. Whilst In many cases the EP will be a trusted node (that is trusted by the UE's home domain), this will not always be the case (e.g. in a "roaming" scenario), and trust cannot be assumed. This is equally true of the IMS case (see FIG. 4), where the initial keying material is available to the P-CSCF which again is not necessarily trusted by the home (IMS) network.

It is an object of the present invention to provide a procedure for delivering application/service keys which can provide strict key separation between the keys used to secure traffic between a user equipment and an access network and those used for application/service delivery.

According to a first aspect of the present invention there is provided a method of delivering an application key or keys to an application server for use in securing data exchanged between the application server and a user equipment, the user equipment accessing a communications network via an access domain, the method comprising:

running an Authentication and Key Agreement procedure between the user equipment and a home domain in order to make keying material available to the user equipment and to an access enforcement point, and using at least a part of said keying material to secure a communication tunnel between the user equipment and the access enforcement point;

deriving one or more application keys within the home domain using at least part of said keying material, providing said application key(s) to said application server, and deriving the same application key(s) at the user equipment, wherein said access enforcement point is unable to derive or have access to said application key(s).

The term "user equipment" as used here is not restricted to any particular protocols or network architecture. The user equipment may be a combination of a user terminal and a subscriber identity module card, or may be only a user terminal. The inventive functionality may be implemented only on the user terminal, or may be implemented on a combination of the user terminal and the subscriber identity module card.

Preferably, running of the Authentication and Key Agreement procedure occurs at registration or re-registration of the user equipment with the home domain. This has the advantage that only a single run of the procedure is required in order to both register the subscriber and thereby establish access protection, and establish keying material from which application keys can be derived.

Domain access via said access enforcement point is preferably controlled by an access enforcement point controller. Said step of running an Authentication and Key Agreement procedure between the user equipment and a home domain comprises sending from the home domain to the access enforcement point controller an authentication vector including a random value, and secondary cipher and integrity keys derivable from the random value, and forwarding the random value to the user equipment. The user equipment then applies a first key derivation function to the random value to generate primary cipher and integrity keys, and applies a second key derivation function to the primary cipher and integrity keys to generate said secondary cipher and integrity keys. The secondary cipher and integrity keys are passed by the access enforcement point controller to the access enforcement point, whereby a secure tunnel can be established between the access enforcement point and the user equipment on the basis of said secondary cipher and integrity keys. In this case, said keying material comprises the random value and the secondary cipher and integrity keys.

Preferably, said application keys(s) are derived at the user equipment and at the home domain using one or both of said primary cipher and integrity keys.

In one embodiment of the invention, said keying material comprises first and second random values and first cipher and integrity keys derivable from the first random value, the method comprising forwarding the random values from the access enforcement point controller to the user equipment, and the user equipment applying a first key derivation function to the first random value to generate first cipher and integrity keys, whereupon a secure tunnel can be established between the access enforcement point and the user equipment on the basis of said first cipher and integrity keys.

Said application key(s) may be derived at the user equipment and within the home domain using said second random value.

The method may comprise deriving said second cipher and integrity keys from the second random value, and then applying a key derivation function to the second cipher and integrity keys to generate the application key(s).

Said steps of deriving an application key or keys within the home domain and at the user equipment may comprise utilising a secret shared between the home domain and the User Equipment to derive the application service key(s) from at least part of said keying material.

Said application service key(s) may be derived by applying a key derivation function to cipher and integrity keys, and to a service node identifier.

Said access enforcement point may be provided within a Proxy Call Session Control Function (P-CSCF) of an IP Multimedia Subsystem (IMS). Said access enforcement point controller may also be provided within the Proxy Call Session Control Function. Within the home domain, a Serving Call Session Control Function (S-CSCF) is responsible for handling said Authentication and Key Agreement procedure in conjunction with a Home Subscriber Server.

Said access enforcement point and access enforcement pint controller may be within a Serving GPRS Support Node (SGSN) of a 2G or 3G network. For the circuit switched domain, the access enforcement point may be within a Radio Network Controller with said access enforcement point controller being within a Visitor Location Register.

In the case where the access network comprises a Long Term Evolution (LTE) access network, said access enforcement point may be a User Plane Entity (UPE)/Mobility Management Entity (MME)/eNodeB, whilst said access enforcement point controller is an MME. Note that this is only tentatively decided in 3GPP.

A User Credential Management Server may be interposed between the Home Subscriber Server and the access enforcement point controller. The role of this server is to derive said secondary cipher and integrity keys and to provide application keys to application servers upon request.

According to a second aspect of the present invention there is provided network based apparatus for delivering an application key or keys to an application server for use in securing data exchanged between the application server and a user equipment, the user equipment accessing a communications network via an access domain, the apparatus comprising:

means for running an Authentication and Key Agreement procedure with the user equipment in order to make keying material available to the user equipment and to an access enforcement point, whereby at least a part of said keying material can be used to secure a communication tunnel between the user equipment and the access enforcement point;

means for deriving one or more application keys using at least part of said keying material, and providing said application key(s) to said application server, the keying material allowing the user equipment to also derive the application key(s) but not allowing said access enforcement point to derive the key(s).

According to a third aspect of the present invention there is provided user equipment for accessing a communications network via an access domain, the user equipment comprising:

means for running an Authentication and Key Agreement procedure with a home domain in order to make keying material available to the user equipment and to an access enforcement point, and using at least a part of said keying material to secure a communication tunnel between the user equipment and the access enforcement point;

means for deriving one or more application keys using at least part of said keying material, and for using the application key to secure a communication tunnel with an application server.

According to a fourth aspect of the present invention there is provided a method of delivering an application key or keys to an application server for use in securing data exchanged between the application server and a user equipment, the user equipment accessing a communications network via an access domain, the method comprising:

running an Authentication and Key Agreement procedure between the user equipment and a home domain in order to make keying material available to the user equipment and to an access enforcement point, and using at least a part of said keying material to secure a communication tunnel between the user equipment and the access enforcement point; and deriving one or more application keys at said access enforcement point using at least part of said keying material, providing said application key(s) to said application server, and deriving the same application key(s) at the user equipment.

Other aspects of the invention are specified in the attached claims.

DETAILED DESCRIPTION OF CERTAIN EMBODIMENTS

The AKA and GBA protocols have been described above with reference to FIGS. 1 to 5, both in the context of 2G/3G core network access and IMS access domain. A mechanism that allows GBA to be implemented without requiring a re-run of AKA will now be described, first in the context of IMS and then in the context of a SAE/LTE enhanced 3G network.

As has already been described above with reference to FIG. 4, a secure IPsec tunnel can be established between the User Equipment (UE) and the P-CSCF on the basis of the cipher and integrity keys CK, IK. Consider now the case where the S-CSCF derives further keys CK' and IK' as follows:

CK'=KDF(CK, P_CSCF_ID)
IK'=KDF(IK, P_CSCF_ID)

where KDF is a Key Derivation Function (for example as defined for GBA). Rather than providing CK and IK to the P-CSCF, the S-CSCF provides the derived keys CK' and IK' as the keys to use for the IPsec tunnel. However, the RAND value provided by the S-CSCF to the UE via the P-CSCF remains the RAND value used to generate the primary keys CK and IK. Thus, the UE is able to generate CK and IK and, using the function KDF, the derived keys CK' and IK'.

Figure 6:
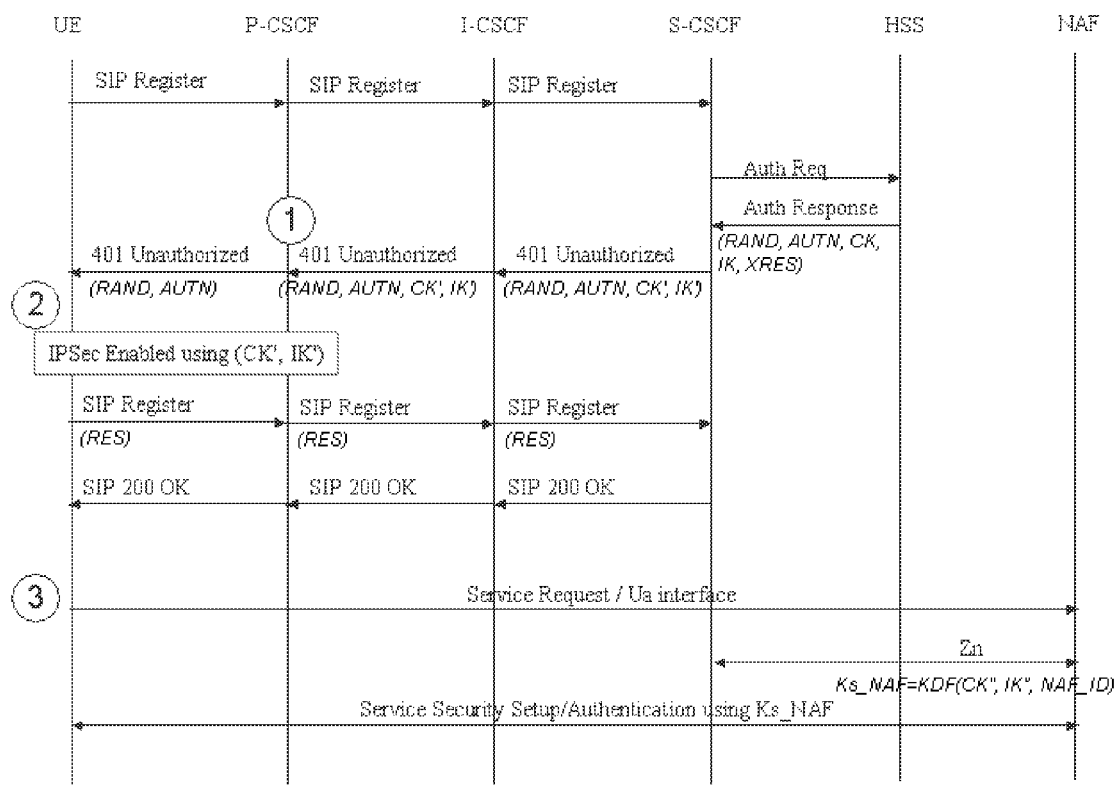
FIG. 6 illustrates a process for establishing keying information shared between a UE and a NAF of an IMS according to a first embodiment of the invention.

The steps of the detailed process are illustrated in FIG. 6:

The UE sends a SIP register to the S-CSCF.

The S-CSCF fetches an Authentication Vector, AV=(RAND, CK, IK, XRES, AUTN), from the HSS.

The S-CSCF derives the two new keys CK' and IK' from CK and IK respectively using some KDF, e.g.,
CK'=KDF(CK, P_CSCF_ID)
IK'=KDF(IK, P_CSCF_ID)

The S-CSCF creates a new special AV'=(RAND, CK', IK', XRES, AUTN) to the P-CSCF.

Figure 1:
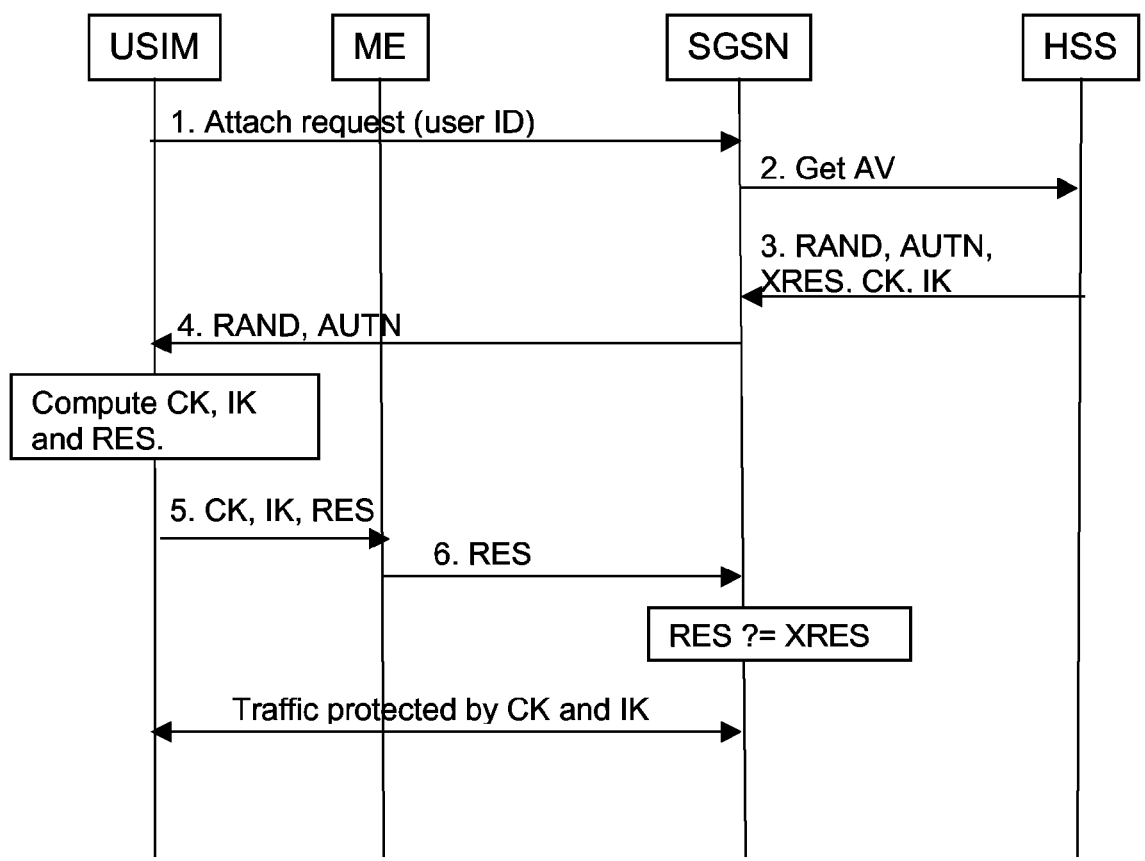
FIG. 1 shows signalling associated with an Authentication and Key Agreement procedure in the packet domain conducted between a user equipment and a home domain, via an access network.
Figure 2:
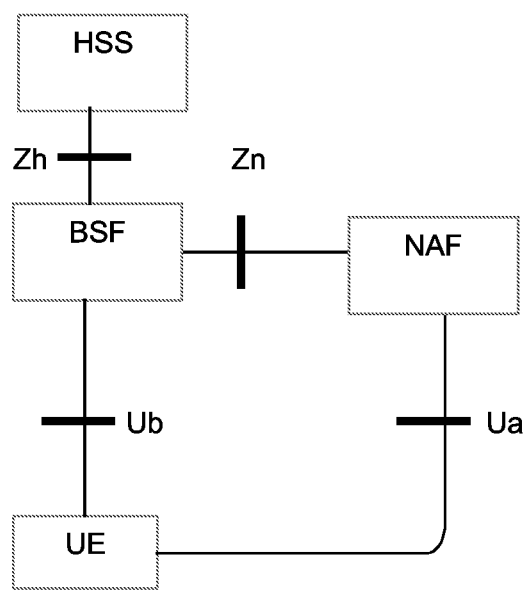
FIG. 2 illustrates schematically the GBA architecture.
Figure 3:
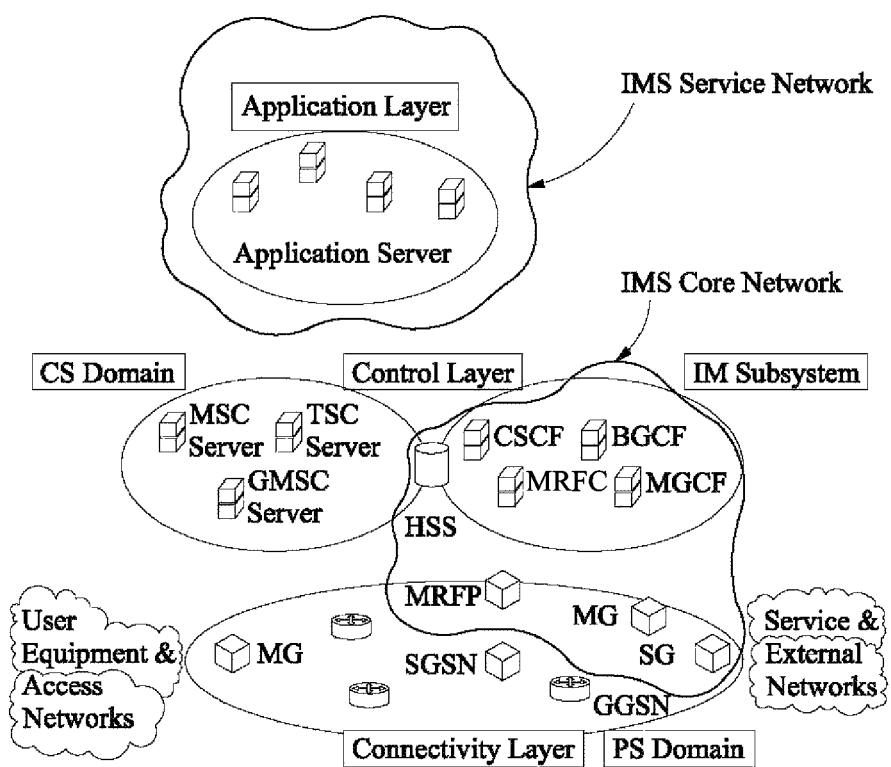
FIG. 3 illustrates schematically an IP Multimedia Subsystem architecture within a cellular telecommunications network.
Figure 4:
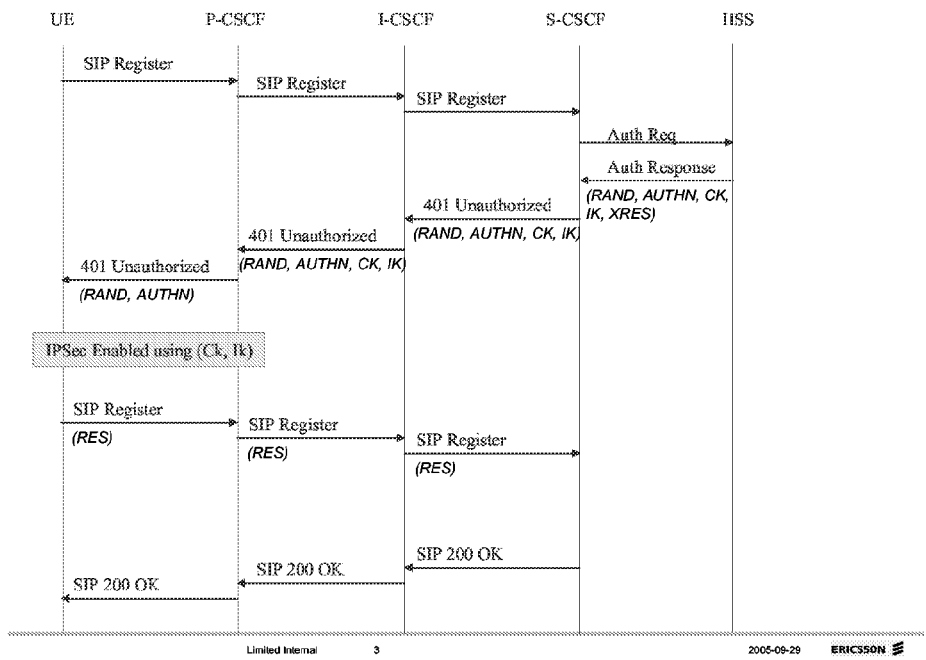
FIG. 4 illustrates an IMS authentication procedure for User Equipment.

The P-CSCF receives AV' and forwards RAND/AUTN to the UE (this step is marked with circle 1 in FIG. 4)

The UE receives the RAND/AUTN and runs this tuple through the ISIM. The result of this operation is that the UE gets back CK and IK from the ISIM. The UE now applies the same KDF as was used by the S-CSCF to compute CK' and IK'. This step is marked with circle 2 in the Figure.

The UE and the P-CSCF establish an IPsec tunnel based on CK' and IK'.

In the step marked with circle 3 in the Figure, the UE derives a service specific key Ks_NAF for the particular NAF it wishes to communicate with. This may be done by applying a KDF, potentially the same as the one previously used, to CK and IK and the NAF_ID. Alternatively, Ks_NAF could be derived by applying a KDF to keys CK" and IK" and the NAF_ID, where for example:

CK"=KDF(CK, <some GBA ID>, <other param>)
IK"=KDF(IK, <some GBA ID>, <other param>).

The reason for deriving CK" and IK" is that a NAF may want to have separate integrity and ciphering keys for the security protocol used between the UE and itself. The NAF could then use CK" and IK" directly. The <some GBA ID> parameter is an ID that identifies the enhanced GBA system (e.g., the string "eGBA", or the string "eGBA@operator.com"), and is used in order to tie the generated keys to this particular key distribution system and to avoid potential key-collisions.

The UE then contacts the NAF and provides the NAF with an identity that uniquely identifies the CK/IK that resulted from the IMS registration. This identity is (in GBA) called B-TID, and is provided to the UE from the BSF during the AKA procedure, i.e. it is provided by the S-CSCF during the IMS registration procedure (when AKA is run).

The NAF contacts the S-CSCF and requests the Ks_NAF corresponding to the given B-TID.

The S-CSCF derives the Ks_NAF from CK and IK in the same way the UE did. The S-CSCF returns the Ks_NAF to the NAF, e.g., Ks_NAF=KDF(CK", IK", NAF_ID, <other param>)

The UE and the NAF can now establish a secure connection based on Ks_NAF.

Figure 7:
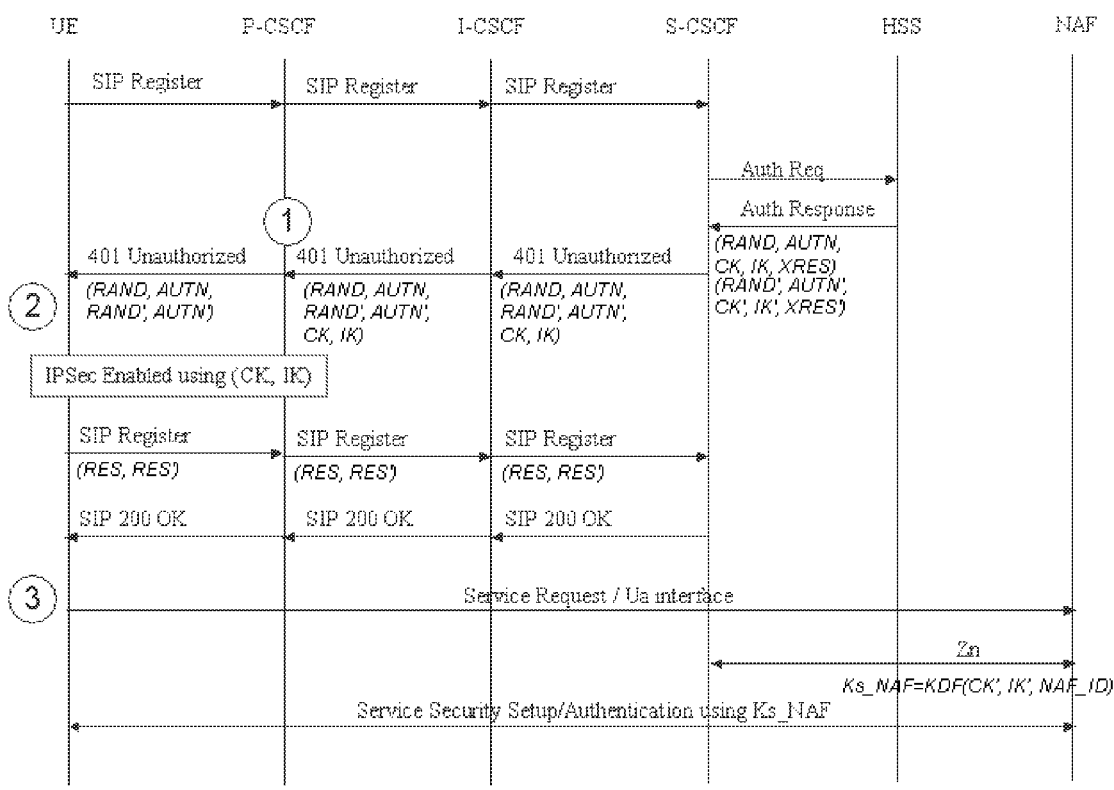
FIG. 7 illustrates a process for establishing keying information shared between a UE and a NAF of an IMS according to a second embodiment of the invention.

Implementation of this process will require changes to the S-CSCF and, perhaps more significantly, to the UEs, even where certain UEs do not require to make use of the additional functionality provided by the GBA process. Whilst this may involve merely a software upgrade to legacy UEs, updating may be cumbersome. This problem is avoided by implementing an alternative process. This involves including a second RAND/AUTN pair (namely RAND' and AUTN') in the initial IMS AKA exchange. In this way, the UE and the S-CSCF can establish two sets of shared keys (CK, IK, and CK', IK'). The first key set is used to establish the IPsec tunnel between the P-CSCF and the UE, whilst the second set can be used to derive keys for the IMS application servers. This alternative process is depicted in FIG. 7. In the event that the UE is a legacy UE which does not support the enhanced GBA functionality, it will simply not see, or ignore, the RAND' and AUTN' values, and will process only RAND and AUTN as normal.

The detailed process steps are as follows:

The UE sends a SIP register to the S-CSCF.

The S-CSCF fetches an AV=(RAND, CK, IK, XRES, AUTN) and an AV'=(RAND', CK', IK', XRES', AUTN') from the HSS.

The S-CSCF sends AV and AV' to the P-CSCF.

Figure 5:
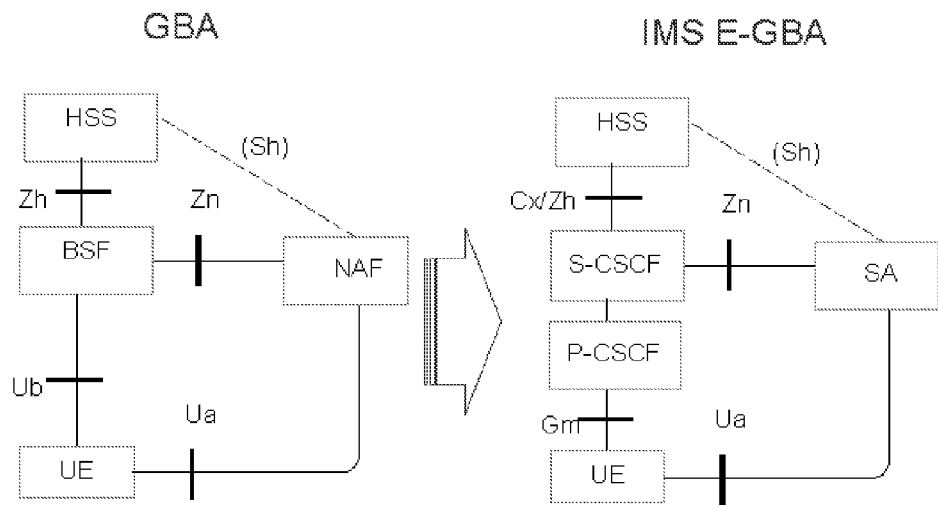
FIG. 5 illustrates schematically the generic GBA architecture, and the GBA architecture mapped to the IMS.

The P-CSCF receives AV and AV' and forwards RAND/AUTN and RAND'/AUTN' to the UE (this step is marked with circle 1 in FIG. 5).

The UE receives the RAND/AUTN and RAND'/AUTN' and runs the RAND/AUTN through the ISIM. The result of this operation is that the UE gets back CK and IK from the ISIM. The UE uses CK and IK to establish the IPsec tunnel with the P-CSCF. The UE runs RAND'/AUTN' through the ISIM and as a result gets back CK' and IK' from the ISIM. This step is marked with circle 2 in the Figure.

In the step marked with circle 3 in the Figure, the UE derives a service specific key Ks_NAF for the particular NAF it wishes to communicate with. This is done by applying a KDF to CK' and IK' and NAF_ID.

The UE contacts the NAF and provides the NAF with an identity (e.g. B-TID) that uniquely identifies the CK'/IK' that resulted from the IMS registration.

The NAF contacts the S-CSCF and requests the Ks_NAF corresponding to the given B-TID.

The S-CSCF derives the Ks_NAF from CK' and IK' in the same way the UE did. The S-CSCF returns the Ks_NAF to the NAF.

The UE and the NAF can now establish a secure connection based on Ks_NAF.

Whilst the alternative approach also requires changes to the S-CSCF for the enhanced functionality to work, the RAND'/AUTN' can be included in the initial IMS AKA exchange in such a way that legacy UEs can still function in the network, i.e. establish a secure tunnel with the P-CSCF. For example, RAND'/AUTN' can be present in a new SIP header, which will not be recognised (and hence ignored) by a legacy UE. Of course, legacy UEs will still not be able to access Application Servers that require a key derived from the RAND'/AUTN' pair.

In a further alternative process, the application service key(s) is(are) derived by following the conventional IMS AKA process, i.e. as illustrated in FIG. 4, and post processing the resulting keys, CK/IK, using a KDF. This is achieved by including an additional argument into the KDF that is known only to the S-CSCF and the UE, i.e., a shared secret. The P-CSCF will again not be able to derive the application service key(s). For example, part (or all) of the KDF could be implemented as a soft-SIM in the UE or a new or existing SIM application in a smart-card accessed by the UE. The KDF could for example contain a regular SIM application as a sub-function. From the network's point of view, the shared secret could be stored in the Authentication Centre (AuC)—it could potentially be the same shared secret used to derive the authentication vectors. This would require that it be possible to request from the AuC, the result of running a given RAND through a particular function (the function could be part of the AuC or it could be supplied by the S-CSCF). The shared secret could also be stored in any other database which responds to queries to compute the function on the given RAND from the S-CSCF.

If the key derivation step described in the previous paragraph is done after a regular IMS registration, the solution will not affect legacy UEs, but the legacy UEs will of course not be able to derive the application service key(s). However, this alternative process is not necessarily optimal because of the significant changes required at the UE and within the IMS.

The S-CSCF may restrict the usage of Application Service keys based on the public user identities received during registration. The S-CSCF can re-use the current IMS subscription handling mechanism for this. When a user registers to the IMS, the user may register one or more public identities, of which some may be classified as barred (not allowed except for limited use cases). The S-CSCF can also ensure that barred identities will not be used by enhanced GBA, by comparing the identity received from the Application Server (to which it requests an AS key) with the barred identities. Of course, the S-CSCF may apply a local policy to allow or disallow enhanced GBA functionality for given users or public user identities, independently of user access to other services.

Figure 8:
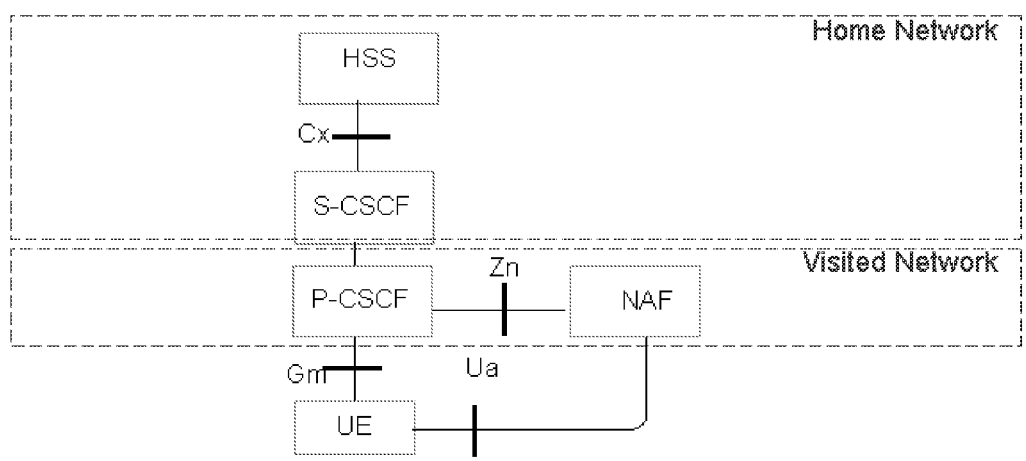
FIG. 8 is a block diagram illustrating implementation of BSF functionality at a P-CSCF of the IMS.
Figure 9:
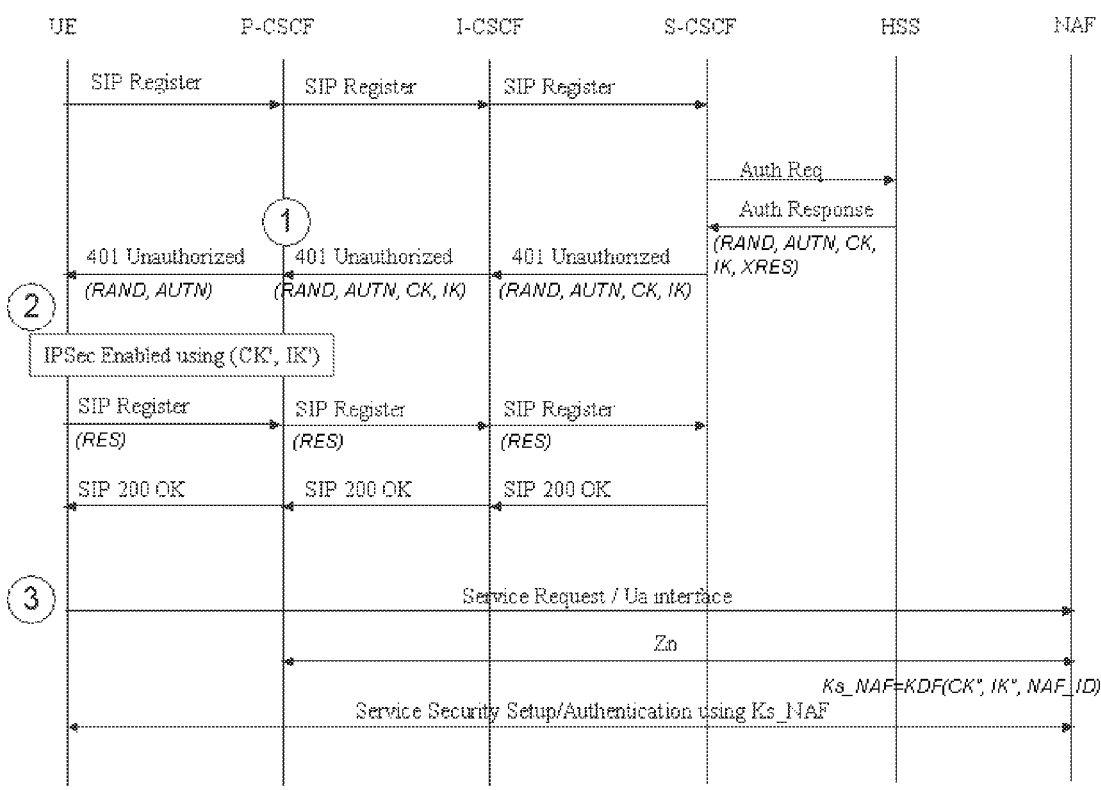
FIG. 9 illustrates a process for establishing keying information shared between a UE and a NAF of an IMS according to a further embodiment of the invention.

The approach described above assumes that the Application Server (NAF) knows the identity of, and is able to communicate with, the S-CSCF. This will be the case when the Application Server is located within the same network as the S-CSCF. However, that may not be the case, and the Application Server may, for example, be located in the same visited network as the P-CSCF. In this case, the P-CSCF may have the BSF functionality toward the AS in the visited network. This is illustrated in FIG. 8. The AS in the visited network must be able to determine whether to contact the P-CSCF or the local S-CSCF (for non-roaming users) to get the AS keys. The AS can make this determination based upon the SIP URI/IMPU or the B-TID (the B-TID contains the name of the UE's home operator) given by the UE. A UE's home operator can decide whether to allow roaming to visited ASs by choosing whether or not to distribute the GBA keys (CK and IK) to the P-CSCF. FIG. 9 shows the message flow for this case. In this first scenario, the derivation of the secondary keys (CK", IK") can be done locally within the P-CSCF. Firstly, CK' and IK' are derived to secure the IPsec tunnel between the UE and the P-CSCF:

CK'=KDF(CK, UE_ID)

IK'=KDF(IK, UE_ID)

Secondly, CK" and IK" are derived:
CK"=KDF(CK, GBA-ID, <other param>)
IK"=KDF(IK, GBA-ID, <other param>)
CK" and IK" are used to derive the AS key (using AS-SERV-ID).

Figure 10:
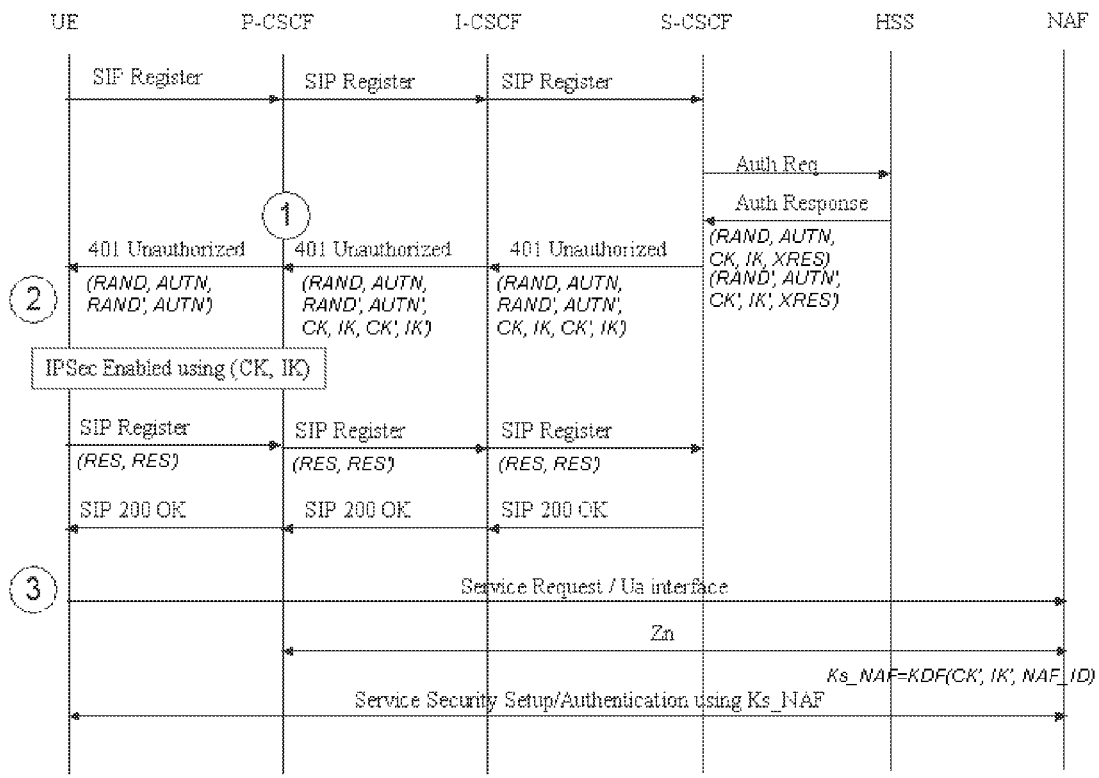
FIG. 10 illustrates a process for establishing keying information shared between a UE and a NAF of an IMS according to a still further embodiment of the invention.

In case separate quintets are used for access security and GBA, the process is as detailed in FIG. 10. Note that in this case, CK" and IK" are distributed to the P-CSCF so that it can derive the Application Service (AS) keys for the different local ASs in the visited network.

Implementation of the inventive procedure in the IMS may provide one or more of the following advantages:
A reduction in the complexity of implementation and in the number of interfaces required by the UE, Application Server and HSS, since GBA per se is not required to establish service keys.
A reduction in the number of roundtrips needed before a secure IMS service can be established.
Strict key separation between keys of individual services.
Cryptographic separation of the access protection keys from the services keys.
Stricter policy control of other Application Services by the IMS system.
Correlation of IMS access with service access.
Avoidance of the need for extra infrastructure elements or extra interfaces to allow Application Service access.
Transparency to the Application Services (as the Zn interface is not affected).

Figure 11:
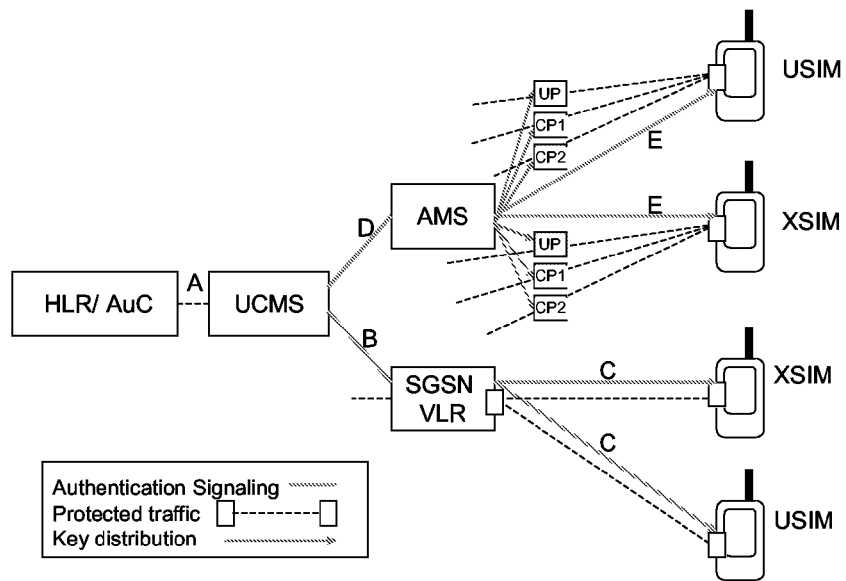
FIG. 11 illustrates schematically a 3G network incorporating a SAE/LTE access network.

Application of the inventive procedure is not limited to IMS. FIG. 11 illustrates schematically system components of a 3G network enhanced with a System Architecture Evolution/Long Term Evolution (SAE/LTE) access network as currently envisaged. The authentication of users in the legacy network is handled by a SGSN in the packet switched domain and by the VLR in the circuit switched domain. From a migration point of view, it is important that the SGSN/VLR should not have to implement any new features. Thus the protocols over the interfaces "B" and "C" remain unchanged. The B interface is hence the same as the current interface between the HLR and SGSN/VLR. Authentication in the new access network is handled by an Authentication Management Server (AMS) which also distributes keys to those network entities that require them. In the example architecture shown, for each UE using the new access network, keys are required for user plane (UP) data protection as well as for two types of control plane (CP1, CP2) data protection.

A User Credential Manager Server (UCMS) is a new entity sitting between the HLR/AuC and the AMS, and between the HLR/AuC and the traditional SGSN/VLR. The UCMS performs a BSF like function, creating a base key and using this key to derive the keys needed by the access network entities AMS and VLR when the proposed new functionality is to be used. The BSF like function within the UCMS will also implement a Zn interface towards NAFs for establishing service keys between the NAF and the UE at a later stage (unless some intermediate entity provides the Zn interface on behalf of the UCMS). The UCMS discriminates between authentication using legacy SIMs and cases when a new enhanced USIM (an "XSIM") is used. When an XSIM is used, a request for AV's from the AMS or SGSN/VLR triggers BSF like functionality. On the other hand, when a legacy SIM is used, the UCMS acts as a transparent entity and merely forwards the requests and responses between the AMS SGSN/VLR and the HLR/AuC.

Consider the scenario where an authentication request is received by the UCMS. The UCMS determines that the request relates to an XSIM. That an XSIM is used may be recognised from, for example, the subscriber's IMSI if a special range of IMSIs is used, or it may be indicated in some other way in the response from the HLR/AuC, e.g. in the encoding of the AV. The UCMS handles the AV in a similar way to which a BSF would have handled a normal GBA transaction. The UCMS forms the key Ks from CK and IK in the AV, i.e. CK'=f(CK, IK), IK'=g(CK, IK) and Ks=h(CK, IK) for some oneway functions f, g, and h, where f!=g!=h. The UCMS stores Ks and the associated B-TID, and then derives a further ciphering key CK' and an integrity key IK'. The UCMS forwards the vector (RAND, AUTN, CK', IK', XRES) to the AMS or SGSN/VLR. As described above with reference to the IMS scenario, the AMS or SGSN/VLR forwards RAND and AUTN to the UE.

At the terminal side, the RAND and the AUTN are entered into the XSIM which performs the GBA derivation of CK and IK and subsequently of CK' and IK', and any other required keys used for protection in the access network. CK' and IK' (and any other required keys) are delivered to the ME. Ks is stored in the XSIM and is the basis for further derivation of NAF specific keys in case the UE wants to use any GBA based services, again as described above with reference to the IMS scenario. The USIM generates RES and returns this to the AMS/VLR which verifies that this value matches XRES. If so, the AMS/VLR passes the keys CK' and IK' to the EP.

It will be appreciated that the UE will receive the same type of information as in current UMTS networks, i.e., RAND, AUTN, and the interface between the ME and the XSIM will use the REL-6 interface for sending RAND, AUTN and receiving the result as a subset. This implies that a REL-6 UE with an XSIM capable of this mechanism would still function.

Figure 12:
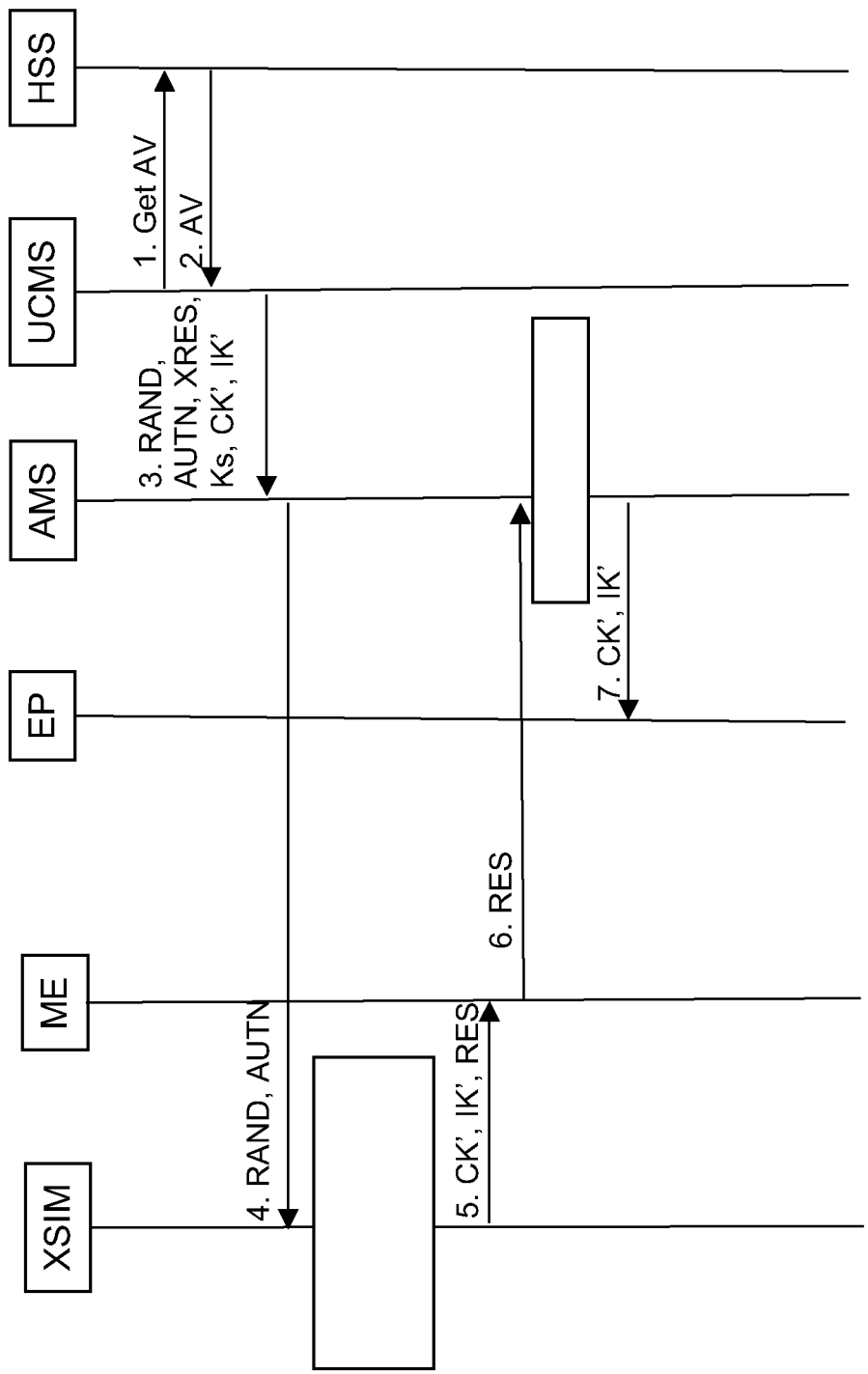
FIG. 12 illustrates a process for initial key establishment in the network of FIG. 11 where authentication is delegated by a home network to a visited network.

The signalling flow in FIG. 12 illustrates the process that follows after the UE has notified the network that it wishes to perform authentication and key establishment. In case the UE is already attached to the network, the network may initiate a re-authentication procedure according to the same signalling flow.

Considering the process steps in more detail:

The AMS or SGSN/VLR may inform the UCMS of the result of the authentication process. This signalling is not shown in FIG. 12 but could be needed if the home network wants to maintain a record of a user's whereabouts (This is discussed further below). In the event that information regarding a subscriber's current attachment is maintained in the HLR, the UCMS may update the HLR when it receives the information from the AMS or SGSN/VLR.

The process described above may be modified by allowing the AuC/HLR to derive CK' and IK', this entity sending an extended AV (eAV) to the UCMS and which contains the CK', IK' and Ks. It is also possible for the AMS/VLR to perform the key derivations for CK' and IK' and not the UCMS. However, this has the implication that the AMS/VLR can also derive the Ks and all the NAF specific keys derived from it. Under certain trust models this may be acceptable.

It can be expected that network architectures incorporating the UCMS entity will have to co-exist with architectures that do not, for some time. During such a migration phase it may be advantageous for the network to signal to the XSIM, a notice indicating whether or not the new key derivations should be performed. There are several ways in which this can be done. Two ways in which this can be done are:

1. The AuC always sets a specific bit in the RAND to 0 (say the LSB). The BSF functionality within the UCMS sets the LSB to 1 if the new key derivations shall be used, and sets it to 0 if the legacy key derivations shall be performed. When the XSIM receives the (RAND, AUTN) it checks the LSB to see which key derivations should be performed, resets the LSB to 0 if necessary and continues. A problem with this approach however is that a malicious user possessing a "hacked" phone could set the LSB of the RAND to 0 before passing the RAND, AUTN to the XSIM. The XSIM would return the real CK/IK to the MS. Not only can the user access the network, he can also derive CK' and IK' and therefore the NAF_keys used to secure any services.

Figure 13:
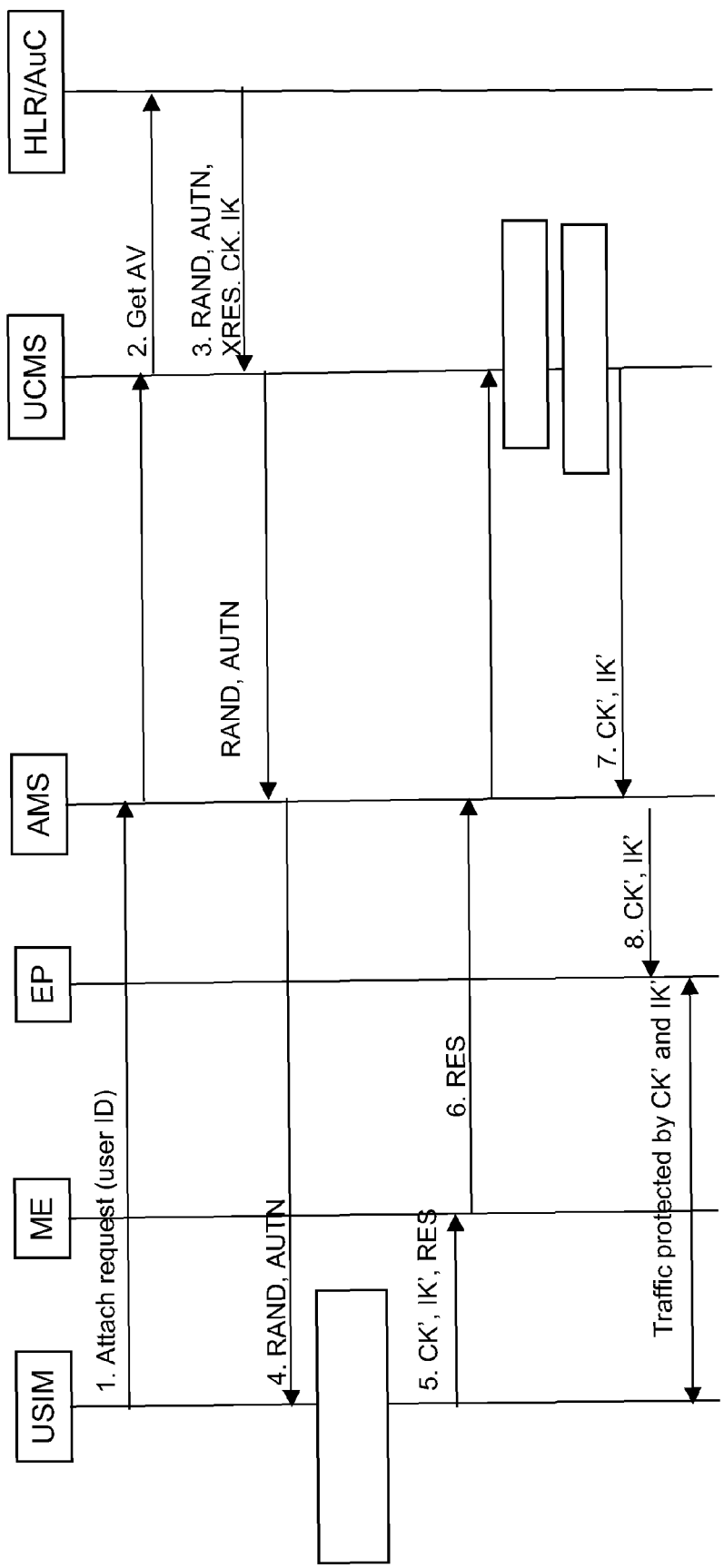
FIG. 13 illustrates a process for initial key establishment in the network of FIG. 11 where authentication is performed with a home network.

2. A second approach is to specify that all AVs that are based on, for example, an even sequence number are to be used with the new key derivation procedure, and all AVs based on odd sequence numbers should be used with the old key derivation procedure. The benefit of this approach is that the sequence number is integrity protected by the key K shared between the AuC and the XSIM. Hence an attacker cannot perform an attack similar to that identified in solution 1. A drawback is however that half of the sequence number space will be wasted for XSIMs using only the new or only the old key derivations.

Where authentication of a subscriber is always performed by the home network, an AMS or SGSN/VLR in the visited network can be used as a relay between the UCMS in the home network and the UE. This would work much like Extensible Authentication Protocol (EAP) AKA, where the AMS or SGSN/VLR assumes the role of a pass through authenticator, i.e., it only relays the authentication traffic. When the UE is authenticated by the UCMS, the UCMS transfers only the keys CK' and IK' to the AMS or SGSN/VLR. It is also possible for the UCMS to derive keys specific for the visited network, e.g., CK'=KDF("visited_NW_name", CK) and IK'=KDF("visited_NW_name", IK). This is illustrated in FIG. 13. Of course, CK' and IK' could be sent earlier, together with the RAND and AUTN values.

Where authentication occurs in the visited network, the BSF would simply talk to the AMS or SGSN/VLR in the visited network as normal (see FIG. 12). It is of course imperative that the signalling between the UCMS and the AMS or SGSN/VLR is confidentiality protected.

The IMS and access models described above may be combined, as the BSF like functionality resident in the S-CSCF and the UCMS is the same. In this case, the conventional S-CSCF does not need to be modified. However, rather than running its regular interface towards the HSS, it will run this towards the UCMS. The common UCMS function may be implemented in the HSS, as a separate entity, or may be combined with a BSF.

It will be appreciated by those of skill in the art that various modifications may be made to the above described embodiments without departing from the scope of the present invention. For example, rather than providing an enhanced USIM (i.e. XSIM) to implement the new functionality, this may be implemented in an enhanced MS, where Ks and B-TID are stored in the ME, and the ME performs the key derivations.

The invention claimed is:

1. A method of delivering an application key or keys to an application server for use in securing data exchanged between the application server and a user equipment, the user equipment accessing a communications network via an access domain, the method comprising:
running an Authentication and Key Agreement procedure between the user equipment and a home domain in order to make keying material available to the user equipment and to an access enforcement point, and
using at least a part of said keying material to secure a communication tunnel between the user equipment and the access enforcement point;
deriving one or more application keys within the home domain using at least part of said keying material, providing said application key(s) to said application server, and
deriving the same application key(s) at the user equipment, wherein said access enforcement point is unable to derive or have access to said application key(s).

2. The method according to claim 1, wherein the running of said Authentication and Key Agreement procedure occurs at registration or re-registration of the user equipment with the home domain.

3. The method according to claim 1, wherein domain access via said access enforcement point is controlled by an access enforcement point controller, said step of running an Authentication and Key Agreement procedure between the user equipment and a home domain comprising:
sending from the home domain to the access enforcement point controller an authentication vector including a random value, and secondary cipher and integrity keys derivable from the random value, and forwarding the random value to the user equipment;
passing the secondary cipher and integrity keys from the access enforcement point controller to the access enforcement point; and
at the user equipment, applying a first key derivation function to the random value to generate primary cipher and integrity keys, and applying a second key derivation function to the primary cipher and integrity keys to generate said secondary cipher and integrity keys, whereby a secure tunnel can be established between the access enforcement point and the user equipment on the basis of said secondary cipher and integrity keys.

4. The method according to claim 3 and comprising deriving said application keys(s) at the user equipment and at the home domain using one or both of said primary cipher and integrity keys.

5. The method according to claim 1, wherein domain access via said access enforcement point is controlled by an access enforcement point controller, said keying material comprising first and second random values and primary cipher and integrity keys derivable from the first random value, the method comprising:
forwarding the random values from the access enforcement point controller to the user equipment, and the user equipment applying a first key derivation function to the first random value to generate primary cipher and integrity keys, whereupon a secure tunnel can be established between the access enforcement point and the user equipment on the basis of said primary cipher and integrity keys.

6. The method according to claim 5 and comprising deriving said application key(s) at the user equipment and within the home domain using said second random value.

7. The method according to claim 6 and comprising deriving secondary cipher and integrity keys from the second random value, and then applying a key derivation function to the secondary cipher and integrity keys to generate the application key(s).

8. The method according to claim 5, said steps of deriving an application key or keys within the home domain and at the user equipment comprising utilizing a secret shared between the home domain and the user equipment to derive the application key(s).

9. The method according to claim 1 and comprising deriving said application key(s) by applying a key derivation function to cipher and integrity keys, and to a service node identifier.

10. The method according to claim 1, wherein said access enforcement point is within a Proxy Call Session Control Function of an IP Multimedia Subsystem.

11. The method according to claim 10, wherein said access enforcement point controller is provided within the Proxy Call Session Control Function, and, within the home domain, a Serving Call Session Control Function is responsible for handling said Authentication and Key Agreement procedure in conjunction with a Home Subscriber Server.

12. The method according to claim 1, wherein said access enforcement point is within a Serving GPRS Support Node of a UMTS access domain.

13. The method according to claim 12, wherein said access enforcement point controller is provided within the Serving GPRS Support Node.

14. The method according to claim 1, wherein said access enforcement point is within a Radio Network Controller of a UMTS access domain.

15. The method according to claim 14, wherein said access enforcement point controller is provided within a Visitor Location Register.

16. The method according to claim 1, wherein said access domain comprises a Long Term Evolution access domain, said access enforcement point being a UPE/MME/eNodeB.

17. The method according to claim 16, wherein said access enforcement point controller is provided within a MME.

18. The method according to claim 16 comprising interposing a user credential management server between a Home Subscriber Server of the home domain and the access enforcement point controller, this server determining secondary cipher and integrity keys and providing application keys to application servers upon request.

19. A network based apparatus for delivering an application key or keys to an application server for use in securing data exchanged between the application server and a user equipment, the user equipment accessing a communications network via an access domain, the apparatus comprising:
means for running an Authentication and Key Agreement procedure with the user equipment in order to make keying material available to the user equipment and to an access enforcement point, whereby at least a part of said keying material can be used to secure a communication tunnel between the user equipment and the access enforcement point;
means for deriving one or more application keys using at least part of said keying material, and providing said application key(s) to said application server, the keying material allowing the user equipment to also derive the application key(s) but not allowing said access enforcement point to derive the key(s).

20. A method of securing communications between User Equipment and an application server via an IP Multimedia Subsystem network, the method comprising:
running an Authentication and Key Agreement procedure between the User Equipment and a Serving Call State Control Function of the IP Multimedia Subsystem network in order to make available to the User Equipment and to a Proxy Call State Control Function, keying material, and using at least a part of said keying material to secure a communication tunnel between the User Equipment and the Proxy Call State Control Function; and
deriving at least one application service key at the Serving Call State Control Function using at least part of said keying material, providing said application service key(s) to said application server, and deriving the same application service key(s) at the User Equipment, wherein the Proxy Call State Control Function is unable to derive said application service key(s).

21. The method according to claim 20, wherein said keying material comprises a random value, and second cipher and integrity keys derivable from the random value, the method comprising
providing these values to the Proxy Call State Control Function from the Serving Call State Control Function, the Proxy Call State Control Function forwarding the random value to the User Equipment, and
the User Equipment applying a first key derivation function to the random value to generate first cipher and integrity keys, and applying a second key derivation function to the first cipher and integrity keys to generate said second cipher and integrity keys, whereupon a secure tunnel can be established between the Proxy Call State Control Function and the User Equipment on the basis of said second cipher and integrity keys.

22. The method according to claim 21, wherein said second cipher and integrity keys are derivable from the random value and from a secret shared between the User equipment and the Serving Call State Control Function or a node couple to the Serving Call State Control Function.

23. The method according to claim 21 comprising deriving said application service key(s) at the User Equipment and at the Serving Call State Control Function using one or both of said first cipher and integrity keys.

24. The method according to claim 20, wherein said keying material comprises first and second random values and first cipher and integrity keys derivable from the first random value, the method comprising
forwarding the random values from the Proxy Call State Control Function to the User Equipment, and the User Equipment applying a first key derivation function to the first random value to generate first cipher and integrity keys, whereupon a secure tunnel can be established between the Proxy Call State Control Function and the User Equipment on the basis of said first cipher and integrity keys.

25. The method according to claim 24, wherein said application service key(s) is(are) derived at the User Equipment and at the Serving Call State Control Function using said second random value.

26. The method according to claim 25 comprising deriving second cipher and integrity keys from the second random value, and then applying a key derivation function to the second cipher and integrity keys to generate the application service key(s).

27. The method according to claim 20, said steps of deriving an application service key or keys at the Serving Call State Control Function and at the User Equipment comprise utilizing a secret shared between the Serving Call State Control Function, or a node coupled to the Serving Call State Control Function, and the User Equipment to derive the application service key(s) from at least part of said keying material.

28. The method according to any one of claim 20, wherein said application service key(s) is(are) derived by applying a key derivation function to cipher and integrity keys, and to a service node identifier.

29. User Equipment for establishing a secure communication link with an application server via an IP Multimedia Subsystem, the method comprising:
   means for running an Authentication and Key Agreement procedure with a Serving Call State Control Function of the IP Multimedia Subsystem network in order to make available to the User Equipment and to a Proxy Call State Control Function, keying material, and for using at least a part of said keying material to secure a communication tunnel between the User Equipment and the Proxy Call State Control Function;
   means for deriving at least one application service key using at least part of said keying material, wherein the Proxy Call State Control Function is unable to derive said application service key(s); and
   means for establishing a secure communication link with said application server using said application service key(s).

30. The method of claim 1, wherein the Application Server is located within the home network of the User Equipment.

31. The method of claim 10, wherein the Application Server is located within a visited network.

32. A method of delivering an application key or keys to an application server for use in securing data exchanged between the application server and user equipment communicating over a network, the user equipment accessing a communications network domain via an access enforcement point, the method comprising the steps of:
   running an Authentication and Key Agreement procedure between the user equipment and a home domain in order to make primary keying material available to the user equipment and to the home domain;
   deriving, at the user equipment and at the home domain, secondary keying material and a stored base key from said primary keying material and providing the access enforcement point with said secondary keying material and using at least a part of said secondary keying material to secure a communication tunnel between the user equipment and the access enforcement point;
   receiving at the home domain a request for application service key, the request at least comprising an identifier of requesting application server and an identifier of said base key;
   deriving within the home domain and at the user equipment, from the identified base key, one or more application service keys at least dependent on the identifier of said server; and
   providing said application service key(s) to said application server, wherein said access enforcement point is unable to derive or have access to said application service key(s).

33. A method of delivering an application key or keys to an application server for use in securing data exchanged between the application server and user equipment communicating over a network, the user equipment accessing a communications network domain via an access enforcement point, the method comprising the steps of:
   running an Authentication and Key Agreement procedure between the user equipment and a home domain in order to make primary keying material available to the user equipment and to the home domain;
   deriving, at the user equipment and at the home domain, secondary keying material and a stored base key from said primary keying material and providing the access enforcement point with said secondary keying material and
   using at least a part of said secondary keying material to secure a communication tunnel between the user equipment and the access enforcement point;
   receiving at the home domain a request for application service key, the request at least comprising an identifier of requesting application server and an identifier of said base key;
   deriving within the home domain and at the user equipment, from the identified base key, one or more application service keys at least dependent on the identifier of said server;
   providing said application service key(s) to said application server;
   wherein said access enforcement point is unable to derive or have access to said application service key(s);
   wherein said access enforcement point is within a Serving GPRS Support Node of a UMTS access domain, or within a Radio Network Controller of a UMTS access domain, or a UPE/MME/eNodeB wherein said access domain comprises a Long Term Evolution access domain.

* * * * *